United States Patent
Han et al.

(10) Patent No.: US 9,055,448 B2
(45) Date of Patent: Jun. 9, 2015

(54) COOPERATIVE BEAMFORMING APPARATUS AND METHOD IN WIRELESS COMMUNICATION SYSTEM

(75) Inventors: Jin Kyu Han, Seoul (KR); Joon Young Cho, Suwon-si (KR); Ju Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 483 days.

(21) Appl. No.: 13/126,351

(22) PCT Filed: Oct. 27, 2009

(86) PCT No.: PCT/KR2009/006214
§ 371 (c)(1), (2), (4) Date: Apr. 27, 2011

(87) PCT Pub. No.: WO2010/050718
PCT Pub. Date: May 6, 2010

(65) Prior Publication Data
US 2011/0211487 A1 Sep. 1, 2011

(30) Foreign Application Priority Data
Oct. 27, 2008 (KR) .................. 10-2008-0105131

(51) Int. Cl.
H04J 11/00 (2006.01)
H04W 4/00 (2009.01)
H04L 27/28 (2006.01)
H04B 7/02 (2006.01)
H04W 16/28 (2009.01)

(52) U.S. Cl.
CPC ............... *H04W 16/28* (2013.01); *H04B 7/024* (2013.01)

(58) Field of Classification Search
CPC ...... H04B 7/024; H04B 7/0695; H04B 7/022; H04B 7/0408; H04W 72/085
See application file for complete search history.

(56) References Cited

U.S. PATENT DOCUMENTS

| | | | |
|---|---|---|---|
| 7,729,325 B2 * | 6/2010 | Gopalakrishnan et al. | ... 370/338 |
| 8,280,444 B1 * | 10/2012 | Shen et al. | ... 455/562.1 |
| 8,391,206 B2 * | 3/2013 | Alexiou et al. | ... 370/328 |
| 2006/0203794 A1 | 9/2006 | Sampath et al. | |
| 2006/0233131 A1 | 10/2006 | Gore et al. | |
| 2006/0280116 A1 * | 12/2006 | Ji et al. | ... 370/210 |
| 2008/0075196 A1 | 3/2008 | Kim et al. | |

(Continued)

FOREIGN PATENT DOCUMENTS
WO   WO 2007111266   10/2007

OTHER PUBLICATIONS
PCT/ISA/237 Written Opinion issued on PCT/KR2009/006214 (6 pp.).
(Continued)

*Primary Examiner* — Melanie Jagannathan
(74) *Attorney, Agent, or Firm* — The Farrell Law Firm, P.C.

(57) ABSTRACT

A cooperative beamforming apparatus and method in a wireless communication system supporting channel sensitive scheduling based on feedback information is provided. A beamforming method in a wireless communication system according to the present invention includes transmitting, at a mobile station, a channel condition information of a channel of a serving base station to the serving base station and a channel condition information of a channel of a neighbor base station; and forming, at the serving base station, a beam based on the channel condition information to transmit a signal and, at the neighbor base station, a beam to transmit a signal.

10 Claims, 9 Drawing Sheets

(56) References Cited

U.S. PATENT DOCUMENTS

| | | | |
|---|---|---|---|
| 2008/0153428 A1* | 6/2008 | Han et al. | 455/69 |
| 2008/0219370 A1* | 9/2008 | Onggosanusi et al. | 375/260 |
| 2008/0274692 A1* | 11/2008 | Larsson | 455/24 |
| 2010/0020702 A1* | 1/2010 | Wong et al. | 370/252 |
| 2011/0064156 A1* | 3/2011 | Kim et al. | 375/267 |

OTHER PUBLICATIONS

PCT/ISA/210 Search Report issued on PCT/KR2009/006214 (3 pp.).

* cited by examiner

COOPERATIVE BEAMFORMING APPARATUS AND METHOD IN WIRELESS COMMUNICATION SYSTEM

TECHNICAL FIELD

The present invention relates to wireless communications and, in particular, to a cooperative beamforming apparatus and method in a wireless communication system supporting channel sensitive scheduling based on feedback information.

BACKGROUND ART

Cellular structure is a basic principle for the configuration of the radio subsystem of a mobile communication system, and the service coverage of the system can be expanded by addition of base stations.

Typically, in the cellular communication system, a user experiences low Signal To Interference and Noise Ratio (SINR) at the cell boundary far from the serving base station due to the signal loss and neighbor cell interferences. In order to maintain the ongoing service in such a situation, it is required to reduce the amount of transmission data or increase resources such as frequency, time, and transmission power as compared to the near users.

Meanwhile, the cellular communication system supports handover from the serving base station to a neighbor base station to secure user mobility. There are two types of handovers: hard handover in which a connection is broken before a new radio connection is established between the mobile station and the base station and soft handover in which a new radio connection is established before the old connection is broken between the mobile station and the base station.

Typically, the $2^{nd}$ Generation (2G) and $3^{rd}$ Generation (3G) Code Division Multiple Access (CDMA) systems adopt the soft handover in uplink direction and the hard handover in downlink direction. However, Orthogonal Frequency Division Multiple Access (OFDMA)-based 4G standards such as Long Term Evolution (LTE) of the 3rd Generation Partnership Project (3GPP) specify the hard handovers in both the uplink and downlink directions. In the CDMA system, a base station can receive the signal transmitted by a mobile station served by another base station, if it knows the channelization code of the mobile station. However, in the OFDMA system which allocates frequency and time resources per mobile station, multiple base stations have to share the resource allocation information for allocating the same frequency and time resources to a single mobile station. That is, the early OFDMA-based 4G system is designed under the assumption of hard handover in consideration of the costly communication between the base stations.

Historically, handover has been considered mainly as an issue related to mobility, however, various researches are conducted recently to improve the communication stability at the cell boundary areas of bad channel conditions. Cooperative network is a concept in which multiple base stations cooperate to support single mobile station based on the shared information. In contrast, distribute network is a network architecture operating without information exchange among base stations.

The cooperative networks can be classified depending on the information level exchanged between the base stations. If multiple base stations share the information destined to the same mobile station, it is possible to implement a cooperative network to transmit the data to the mobile station simultaneously. If multiple base stations share the information on the frequency and time resources and power allocated to a mobile station but not the data destined to the mobile station, it is possible to implement a cooperative network to avoid inter-cell interferences. In the former case, the information amount exchanged between the base station increases, but equivalent channel condition is improved from the viewpoint of the mobile station. In the latter case, it is difficult to expect the improvement of the equivalent channel condition to that extent in the former case, but any improvement with the cost of tiny increase of information exchange between the base stations.

In the meantime, beamforming is a technique to improve the equivalent channel condition of the user by applying beamforming weights to multiple antennas of the base station individually for optimal channel of the user. The beamforming weights have to be adjusted individually in adaptation to the time-varying channel characteristics. If the spatial characteristics of the channels are known, the base station can compute the beamforming weights. In uplink direction, the base station can compute the appropriate beamforming weights of the antennas using the reference signals transmitted by the mobile station for demodulation. In case that the spatial characteristics of the channel are not known, the base station has to receive feedback signal transmitted by the mobile station for acquiring the spatial characteristics of the channel. In the Frequency Division Duplex (FDD) system, the base station has no way to acquire the spatial characteristics of the channel in downlink direction, thereby requiring channel condition report from the mobile station.

The feedback information transmitted by the mobile station for supporting beamforming weight computation of the base station includes Channel Matrix Indicator (CMI) and Precoding Matrix Indicator (PMI). Since the base station is provided with plural transmit antennas, the channel conditions are expressed in the form of vector or matrix. The feedback information is quantized to improve the reliability such that a channel matrix set composed of a predetermined number of elements representing the channel vectors or matrices is defined. The mobile station selects a channel vector or matrix indicative of its channel condition from the channel matrix set and reports the CMI indicating the selected channel vector or matrix to the base station. The PMI is fed back to report the user preference beamforming weights. The mobile station selects an element from a beamforming weight matrix composed of a predetermined number of elements representing the beamforming weight available for the base station and reports the PMI indicating the selected beamforming weight to the base station.

FIG. 1 is a schematic diagram illustrating a transmission beamforming in a conventional distributed network cellular structure.

In FIG. 1, the mobile station 105 is connected to the base station 101, the mobile station 107 is connected to the base station 103, and the base stations 101 and 103 do not share the information related to the beamforming and resource allocation. The base station 101 forms its beam as denoted by reference numeral 111 to transmit a signal to the mobile station 105, and the base station 103 forms its beam as denoted by reference numeral 113 to transmit a signal to mobile station 107. Since the two base stations 101 and 103 do not share information, the beam 111 and 113 are formed independently. In this case, the base station 101 focus the beam 111 to improve the SINR for the mobile station 105, however, the beam 111 may be influenced by the beam 111 formed by the base station 103. That is, the signal transmitted by the base station 103 can act as storing interference to the mobile station 105, whereby the SINR improvement effect of the beam 111 is nullified. This means that the independent beamforming of the base stations do not guarantee the SINR improvement for the mobile station.

FIG. 2 is a schematic diagram illustrating a transmission beamforming in a conventional cooperative network cellular structure.

In FIG. 2, the mobile stations 107 and 207 are connected to the base station 103. Meanwhile, the base station 101 schedules the mobile station 105 to form the beam 111. In this situation, if the base station 103 forms a beam for transmitting signal to the mobile station 107, the beam focused to the mobile station 107 is likely to make interference to signal transmitted from the base station 101 to the mobile station 105 as in FIG. 1. In the cooperative network, however, a cluster controller 201 controls the scheduling operations of the two base stations 101 and 103, such that the two base stations 101 and 103 can perform scheduling and beamforming without interfering with each other. With the cooperation between the base stations 101 and 103, the base station 103 forms the beam 213 focused to the mobile station 207 while the base station 101 forms the beam 111 focused to the mobile station 105 far from the mobile station 207 enough to avoid interference, it is possible to guarantee the improvement of SINRs of the downlink channels of the base stations 105 and 207.

The cluster scheduler 201 can be located near the base station 101 or 103 geographically or at a remote place. The cluster scheduler 201 makes a determination for interference-free scheduling, power allocation, and beamforming and reports the determination result to the base stations under the control of the cluster scheduler 201. Here, the term cluster means a set of the base stations under the control of the scheduler.

FIG. 3 is a sequence diagram illustrating operations of network elements in a distributed network cellular structure of FIG. 1 for channel sensitive scheduling.

Referring to FIG. 3, the mobile station 301 is connected to the base station 303. In order for the base station 303 to perform the channel sensitive scheduling, the mobile station 301 sends channel condition information such as Channel Quality Indicator (CQI) and Precoding Matrix Indicator (PMI) to the base station 303 (305). The base station 303 receives the feedback information such as the CQI and/or PMI from all the mobile stations within the cell, generates resource allocation and beamforming information based on the feedback information, and sends the resource allocation and beamforming information to the mobile station 301 in the form of control information.

FIG. 4 is a sequence diagram illustrating operations of network elements in a cooperative network cellular structure of FIG. 2 for channel sensitive scheduling.

Referring to FIG. 4, the mobile station 301 is connected to the base station 303. The mobile station 301 sends channel condition information such as CQI and PMI to the base station 303 in order for the base station to perform channel sensitive scheduling and beamforming in consideration of the interference with neighbor base station 403 (405). At this time, two types of PMIs can be transmitted: one intended to be used by serving base station 303 and the other intended not to be used by the neighbor base station 403.

The serving base station 303 collects the feedback information transmitted by the mobile stations within the cell and delivers the feedback information to the cluster scheduler 401 (407). The neighbor base station 403 also collects the feedback information transmitted by the mobile stations within its cell and delivers the feedback information to the cluster scheduler 401 (409). The cluster scheduler 401 generates downlink scheduling information including scheduling, resource allocation, and beamforming parameters for the base stations 303 and 403 under its control and sends the downlink scheduling information to the base stations 303 and 403 (411). Upon receipt of the downlink scheduling information, the base station 303 sends the control information generated based on the downlink scheduling information to the mobile station 301 along with the transmission signal (413).

The cooperative network architecture has been introduced to improve downlink SINR of the mobile stations. However, the conventional cooperative network does not help improving the uplink SINR of the mobile station at the cell boundary area. Furthermore, transmitting additional feedback information, i.e. PMI intended not to be used by the neighbor base station, as well as the CQI and PMI intended to be used by the serving base station must be burdensome from the viewpoint of the mobile station located at the cell boundary area. That is, the conventional cooperative network must pay significant cost in uplink direction for improving the SINR in downlink direction.

DISCLOSURE OF INVENTION

Technical Problem

In order to overcome the above problems of the prior art, the present invention provides a cooperative beamforming apparatus and method that is capable of improving SINR in downlink direction without increasing feedback amount.

Also, the present invention provides a cooperative beamforming apparatus and method that is capable of achieving cooperative beamforming gain without costly cooperative network implementation by providing a PMI intended not to be used in the neighbor base station to the corresponding neighbor base station.

Solution to Problem

In accordance with an exemplary embodiment of the present invention, a beamforming method in a wireless communication system includes transmitting, at a mobile station, a channel condition information of a channel of a serving base station to the serving base station and a channel condition information of a channel of a neighbor base station; and forming, at the serving base station, a beam based on the channel condition information to transmit a signal and, at the neighbor base station, a beam based on the channel condition information to transmit a signal.

In accordance with another exemplary embodiment of the present invention, a beamforming method in a wireless communication system includes transmitting, from a mobile station, a channel condition information of a serving base station to the serving base station and a channel condition information of a neighbor base station to the neighbor base station; forwarding the channel condition informations from the serving and neighbor base stations to a scheduler; delivering a beamforming decision made based on the channel condition information from the scheduler to the serving and neighbor base stations; and forming, at the serving and neighbor base stations, beams based on the beamforming decision respectively.

In accordance with another exemplary embodiment of the present invention, a feedback method of a mobile station for beamforming in a wireless communication system includes estimating, when a signal is received, channels of a serving base station and a neighbor base station and measuring channel qualities of the serving and neighbor base stations; and reporting the channel quality of the serving base station to the serving base station and the channel quality of the neighbor base station to the neighbor base station.

In accordance with another exemplary embodiment of the present invention, a feedback device of a mobile station for supporting beamforming in a wireless communication system includes a received signal processor which processes signals received from a serving base station and a neighbor base station; a serving cell condition measurer which measures a channel condition of the serving base station based on the signal received from the serving base station; a neighbor cell condition measurer which measures a channel condition of the neighbor base station based on the signal received from the neighbor base station; and a transmission signal processor which transmits the channel condition of the serving base station to the serving cell and transmits the channel condition of the neighbor base station to the neighbor base station.

Advantageous Effects of Invention

The cooperative beamforming apparatus and method of the present invention is advantageous to perform a cooperative network-based cooperative beamforming in downlink direction without increase feedback burden of mobile stations.

Also, the cooperative beamforming apparatus and method of the present invention is advantageous to perform a distributed network-based cooperative beamforming in downlink direction without cooperation between the base stations by allowing the mobile stations to report a negative PMI, which is intended not to be used by neighbor base stations, to the neighbor base stations.

MODE FOR THE INVENTION

Figure 1:
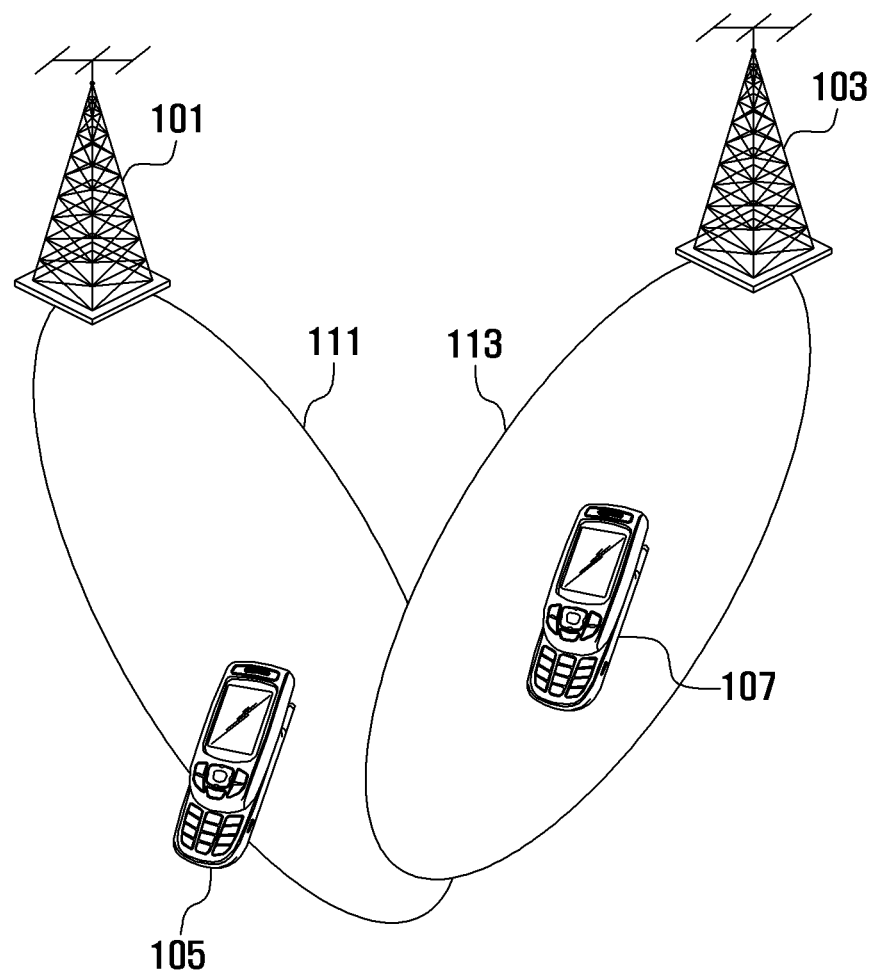
FIG. 1 is a schematic diagram illustrating a transmission beamforming in a conventional distributed network cellular structure.
Figure 2:
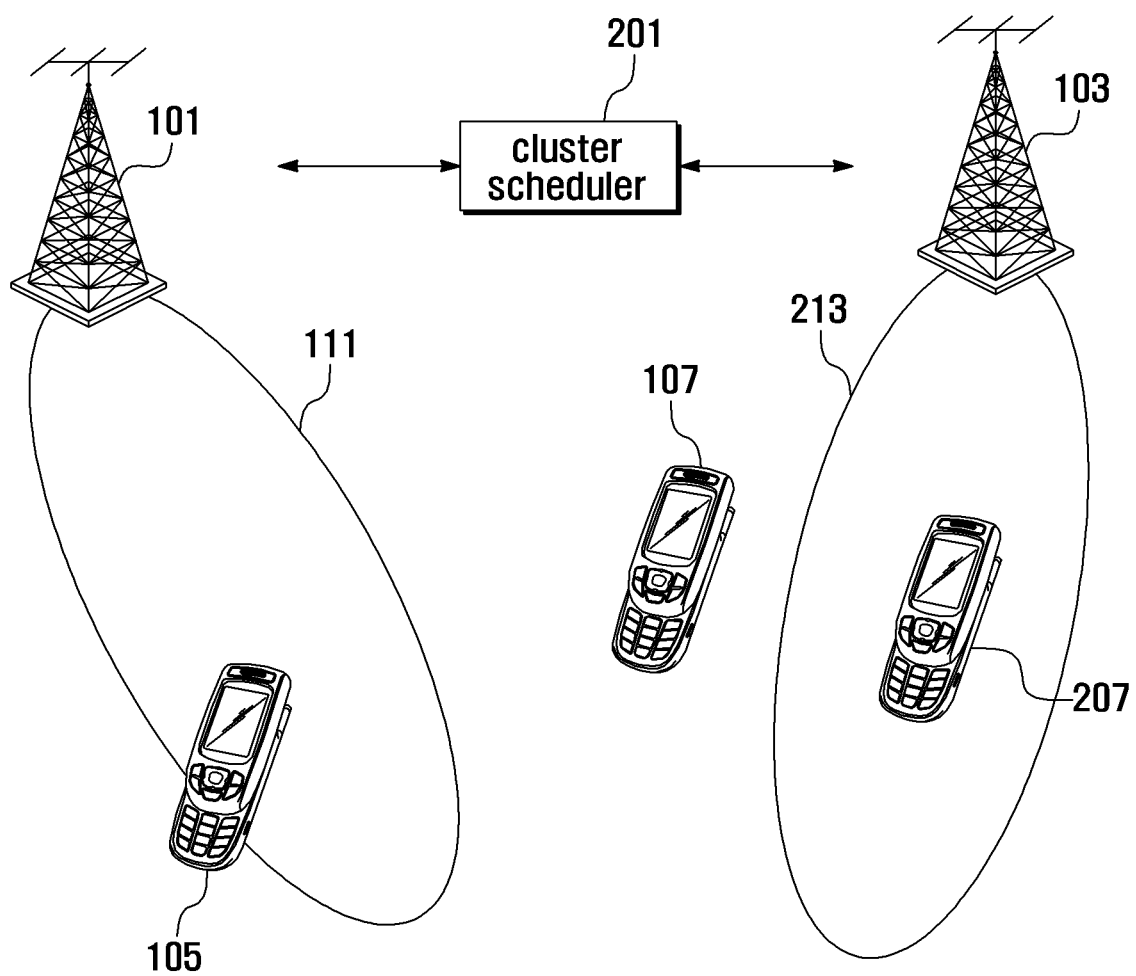
FIG. 2 is a schematic diagram illustrating a transmission beamforming in a conventional cooperative network cellular structure.
Figure 3:
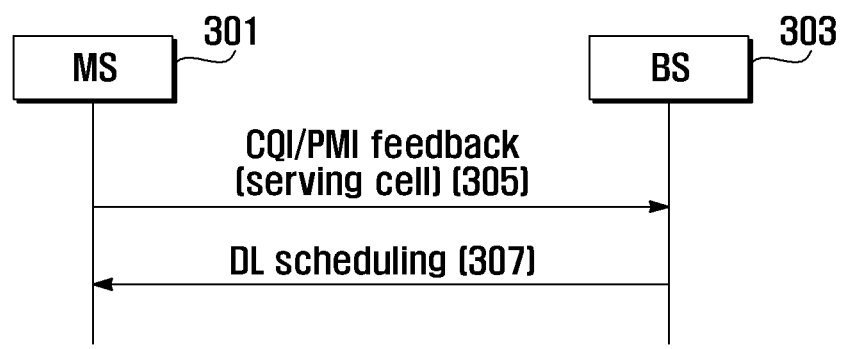
FIG. 3 is a sequence diagram illustrating operations of network elements in a distributed network cellular structure of FIG. 1 for channel sensitive scheduling.
Figure 4:
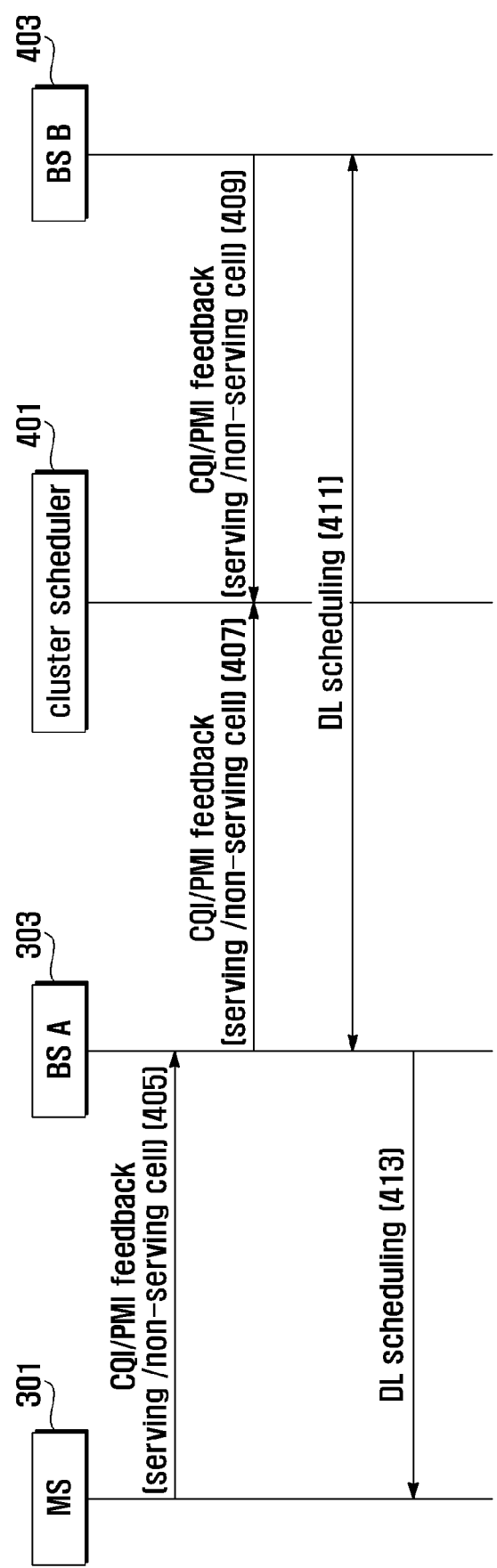
FIG. 4 is a sequence diagram illustrating operations of network elements in a cooperative network cellular structure of FIG. 2 for channel sensitive scheduling.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Wireless communication systems are evolving to meet the requirements for wireless packet data communication system for high speed and high quality multimedia services including data and video as well as convention voice. Recently, various wireless communication standards and technologies such as High Speed Downlink Packet Access (HSDPA) and High Speed Uplink Packet Access (HSUPA) of the $3^{rd}$ Generation Partnership Project (3GPP), High Rate Packet Data (HRPD) of 3GPP2, and 802.16x of Institute of Electrical and Electronics Engineers (IEEE) have been developed for supporting high speed and high quality radio packet data communication services.

The 3G wireless packet data communication systems including HSDPA, HSUPA, and HRPD use Adaptive Modulation and Coding (AMC) and channel sensitive scheduling techniques for improving transmission efficiency. Using the AMC, the transmitter can adjust the data amount to be transmitted according to the channel status. That is, the AMC enables reducing the transmission data amount in a bad channel condition to decrease the reception error probability to some extent and increasing the transmission data amount in a good channel condition to maximize the transmission rate while maintaining the reception error probability to the extent. The channel sensitive scheduling technique enables the transmitter to serve the user equipment having the best channel condition among plural user equipments so as to maximize the system throughput. Such system throughput improvement is achieved by multi-user diversity gain. The ACM and channel sensitive scheduling methods allows the transmitter to select the modulation and coding scheme at the best timing based on the partial channel information fed back by the receiver.

Recently, researches are conducted for migration from Code Division Multiple Access (CDMA) to Orthogonal Frequency Division Multiple Access (OFDMA) in 2G and 3G wireless communication systems. The OFDMA-based evolved communication technologies are in the middle of standardization in both 3GPP and 3GPP2. Typically, it is known that the OFDMA technology is superior to the CDMA technology in system throughput. One of the main factors increasing throughput of OFDMA-based system is a frequency domain scheduling. As the channel sensitive scheduling method which uses the time-varying characteristic of wireless channels to achieve the throughput gain, the frequency domain scheduling can achieve further throughput gain by using the frequency-varying characteristic.

With the implementation of the AMC and channel sensitive scheduling, a base station can allocate the resources including the frequency, time, and power in adaptation to the channel conditions of multiple users. In order to support the adaptive resource allocation, it is required for the user equipments to report channel conditions based on the reference signal transmitted by the base station. Such a channel condition reporting process is called CQI feedback.

The adaptive resource allocation is implemented with appropriate CQI feedback mechanism. For instance, the frequency selective scheduling is implemented with a band-specific CQI feedback in which the channel quality of a specific frequency band of a system bandwidth is reported. In another exemplary case that a base station is provided with a plurality of transmit antennas and supports multiple beamforming, a beam-specific CQI feedback in which the channel condition of a specific beamforming is reported is appropriate for space selective scheduling.

Although the cooperative beamforming technique is directed to a wireless communication system in which the mobile station feeds back the CQI and PMI in the following description, the present invention is not limited thereto. For instance, the cooperative beamforming technique of the present invention can be applied to a wireless communication in which the mobile terminal reports quantized channel value as the feedback information.

The mobile station reports channel quality information such as CQI and PMI in order for the serving base station to perform a channel sensitive scheduling and beamforming in consideration of the interference suppression between the serving and neighbor base stations. In an exemplary embodiment of the present invention, two PMIs are reported. The first PMI is a positive PMI that is intended to be used by the serving base station, and the second PMI is a negative PMI that is intended not to be used by the neighbor base station. The negative PMI is the feedback information for suppressing interference from the neighbor base station, and it can be replaced by a neighbor-specific positive PMI, i.e. a PMI that is intended to be used by the neighbor base station. The feedback of a negative PMI means that the negative PMI-based beamforming of the neighbor base station causes significant interference to the mobile station, and the feedback of a neighbor-specific positive PMI means that the positive PMI-based beamforming of the neighbor base station suppresses the interference to the mobile station. In an exemplary embodiment of the present invention, the cooperative beamforming technique is described with the use of the negative PMI. However, the negative PMI can be replaced by the neighbor-specific positive PMI.

In an exemplary embodiment of the present invention, a channel information feedback mechanism is proposed to improve the communication performance of the mobile station experiencing bad channel condition at the cell boundary area with the cooperation of base stations. In order to implement the cooperative beamforming according to an exemplary embodiment of the present invention, the mobile station reports a PMI that is intended not to be used by the neighbor base station (negative PMI) as well as the CQI and PMI that is intended to be used by the serving base station (positive PMI). Since the uplink channel condition at the cell boundary is not improved even when the cooperative beamforming is adopted, the negative PMI as additional feedback information is burdensome. In an exemplary embodiment of the present invention, the mobile station reports the CQI and positive PMI to the serving base station and the negative PMI to the neighbor base station in order to mitigate the serving base station-centric feedback burden at the cell boundary area. Since the feedback burden is distributed, it is possible to achieve the cooperative beamforming gain while reducing the serving base station-centric feedback burden. Furthermore, the cooperative beamforming technique according to an exemplary embodiment of the present invention can be implemented without cooperation between base stations, thereby simplifying network structure.

Figure 5:
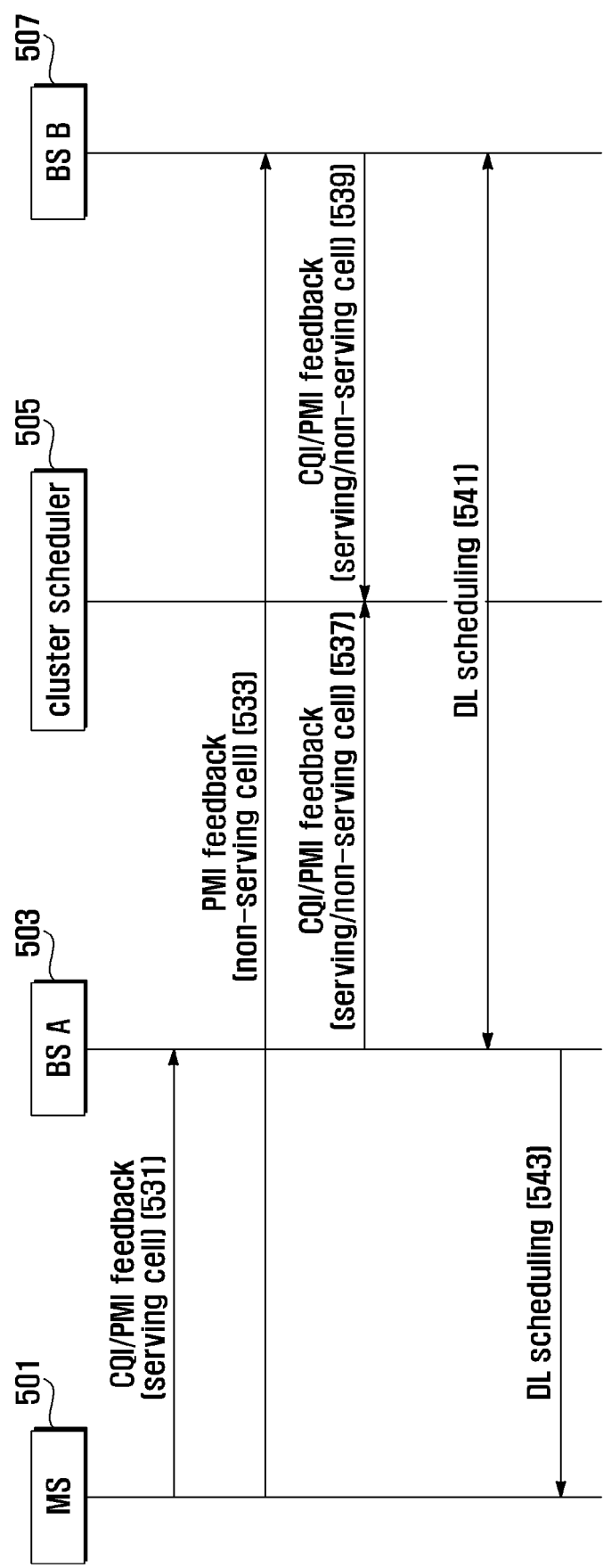
FIG. 5 is a sequence diagram illustrating operations of network elements of a wireless communication system for channel sensitive scheduling and cooperative beamforming according to an exemplary embodiment of the present invention.

FIG. 5 is a sequence diagram illustrating operations of network elements of a wireless communication system for channel sensitive scheduling and cooperative beamforming according to an exemplary embodiment of the present invention. In the exemplary embodiment of FIG. 5, the mobile station sends the neighbor base station a PMI that is intended not to be used by the neighbor base station (negative PMI).

Referring to FIG. 5, the base station 501 reports the CQI and positive PMI to the service base station 503 (531) and the negative PMI to the neighbor base station 507 (533). Upon receipt of the CQI and positive PMI, the serving base station 503 forwards the CQI and positive PMI to the cluster scheduler 505 (537). Also, the neighbor base station 507 forwards the negative PMI received from the mobile station 501 to the cluster scheduler 505 (539). At this time, the PMI transmitted by the serving base station 503 is the positive PMI that is intended to be used by the serving base station 503, and the PMI transmitted by the neighbor base station 507 is the negative PMI that is intended not to be used by the neighbor base station 507.

The cluster scheduler 505 collects the feedback information of the mobile stations that are transmitted by the base stations 503 and 507 under its control and generates downlink scheduling information related to the scheduling, resource allocation, and beamforming per base station. Next, the cluster scheduler 505 sends the downlink scheduling information to the respective base stations 505 and 507 (541). If the downlink scheduling information is received, the serving base station 503 sends the control information generated based on the downlink scheduling information to the mobile station 501 along with the transmission signal (543).

Figure 6:
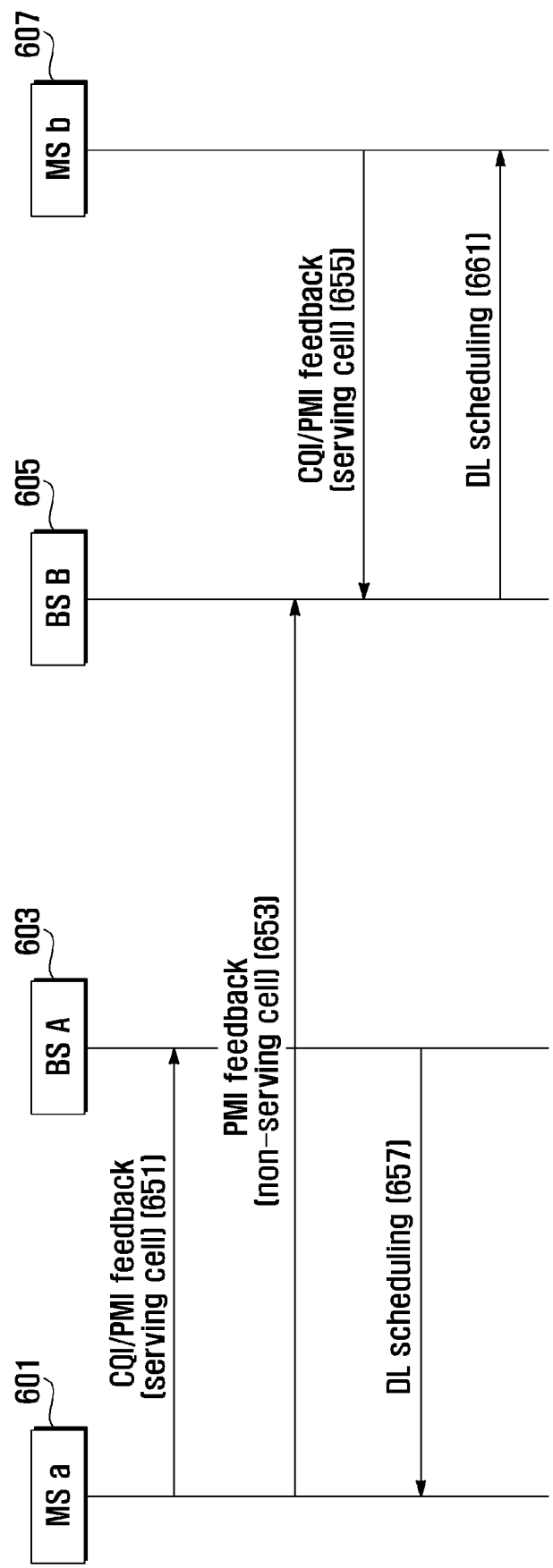
FIG. 6 is a sequence diagram illustrating operations of network elements of a wireless communication system for channel sensitive scheduling and cooperative beamforming according to another exemplary embodiment of the present invention.

FIG. 6 is a sequence diagram illustrating operations of network elements of a wireless communication system for channel sensitive scheduling and cooperative beamforming according to another exemplary embodiment of the present invention. In the exemplary embodiment of FIG. 6, the mobile station sends the neighbor base station a PMI that is intended not to be used by the neighbor station (negative PMI), and the network is structured in a distributed network architecture without involvement of a cluster scheduler.

Referring to FIG. 6, the mobile station a 601 is connected to the base station A 603, and the mobile station b 607 is connected to the base station B 605. The mobile station a 601 reports its feedback information including a CQI and a positive PMI to its serving base station A 603 (651), and the mobile station b 607 reports its feedback information including a CQI and a positive PMI to its serving base station B 605 (655). Meanwhile, the mobile station a 601 sends the base station B 605 a negative PMI that is intended not to be used by a neighbor base station (653). Also, the mobile station b 607 can send the base station A 603 a negative PMI that is intended not to be used by a neighbor base station. In the exemplary embodiment of FIG. 6, each base station receives the CQI and positive PMI from the mobile stations within the serving cell and the negative PMI from the base stations within the neighbor cell and makes a decision for scheduling and beamforming based on these CQI and positive and negative PMIs by itself without involvement of a cluster scheduler. Accordingly, the base station A 603 makes a decision for scheduling and beamforming based on the feedback information (here, the positive PMI) and sends the control information containing the decision result to the mobile station a 601 along with a transmission signal (657). Meanwhile, the base station B 605 makes a decision for scheduling and beamforming based on the feedback information (here, the positive PMI received from the mobile station b 607 and the negative PMI received from the mobile station a 601) and sends the control information containing the decision result to the mobile station b 607 (661). Here, the base station B 605 makes the scheduling and beamforming decision with the in consideration of the negative PMI received from the mobile station a 601 such that the negative PMI is excluded to make its beamforming decision.

Figure 7:
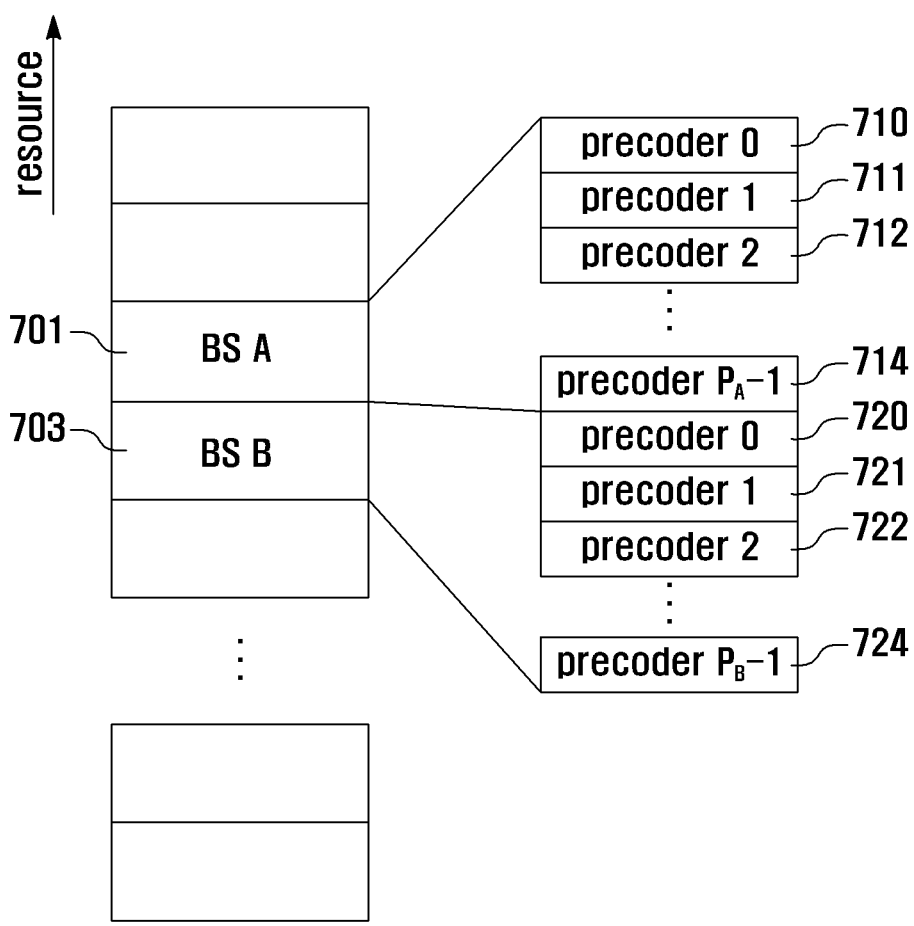
FIG. 7 is a diagram illustrating a principle to allocate resource for reporting negative PMI in the cooperative beamforming technique according to an exemplary embodiment of the present invention.

FIG. 7 is a diagram illustrating a principle to allocate resource for reporting negative PMI in the cooperative beamforming technique according to an exemplary embodiment of the present invention. The information on the feedback resource depicted in FIG. 7 can be stored in the storage device of the mobile station.

Referring to FIG. 7, a resource 701 is allocated for feedback to a base station A, and a resource 703 is allocated for feedback to a base station B. The feedback resources can be the frequency and time resources or code resources identified by channelization codes. The feedback resources can be allocated per mobile station or commonly allocated to all the mobile stations within the cluster. In the former case, the base station can identify the mobile station reported the feedback information and the serving cell of the mobile station to support the cooperative beamforming based on the cooperative network structure. In the latter case, the base station cannot identify the mobile station reported the feedback information but support the cooperative beamforming based on the distributed network structure.

Each of the resources 701 and 703 is mapped to a set of beamforming vectors (precoders). If a mobile station wants the base station A to not use a beamforming vector 2, it transmit the beamforming vector 1 using a resource element 712 of the resource 701. The base station can identify the beamforming vector which is intended not to be used based on the resource element in which a signal is received. The resource elements 710, 411, 712, and 414 of the resource 701 that are mapped to the beamforming vectors can be the frequency, time, or channelization code indices.

In case of distributed network structure-based cooperative beamforming, the mobile stations transmit the beamforming vectors that are not intended to be used by neighbor base stations using the commonly shared resources. If a predetermined level of energy is detected at a specific resource, the base station can recognize that the mobile stations within the neighbor cell want it to do not use the beamforming vector mapped to the specific resource. In this case, it is not required for the base station to know which mobile station has sent the negative feedback information. The more a number of mobile stations sending the negative feedback information with the same resource is, the higher the energy level of the resource is.

The feedback resources for sending negative feedback information to the neighbor cells within the cluster is predefined and shared by the base stations under the control of the cluster. The feedback resource structure is provided by higher layer signaling in the mobile station prior to the configuration of the feedback channel.

Figure 8:
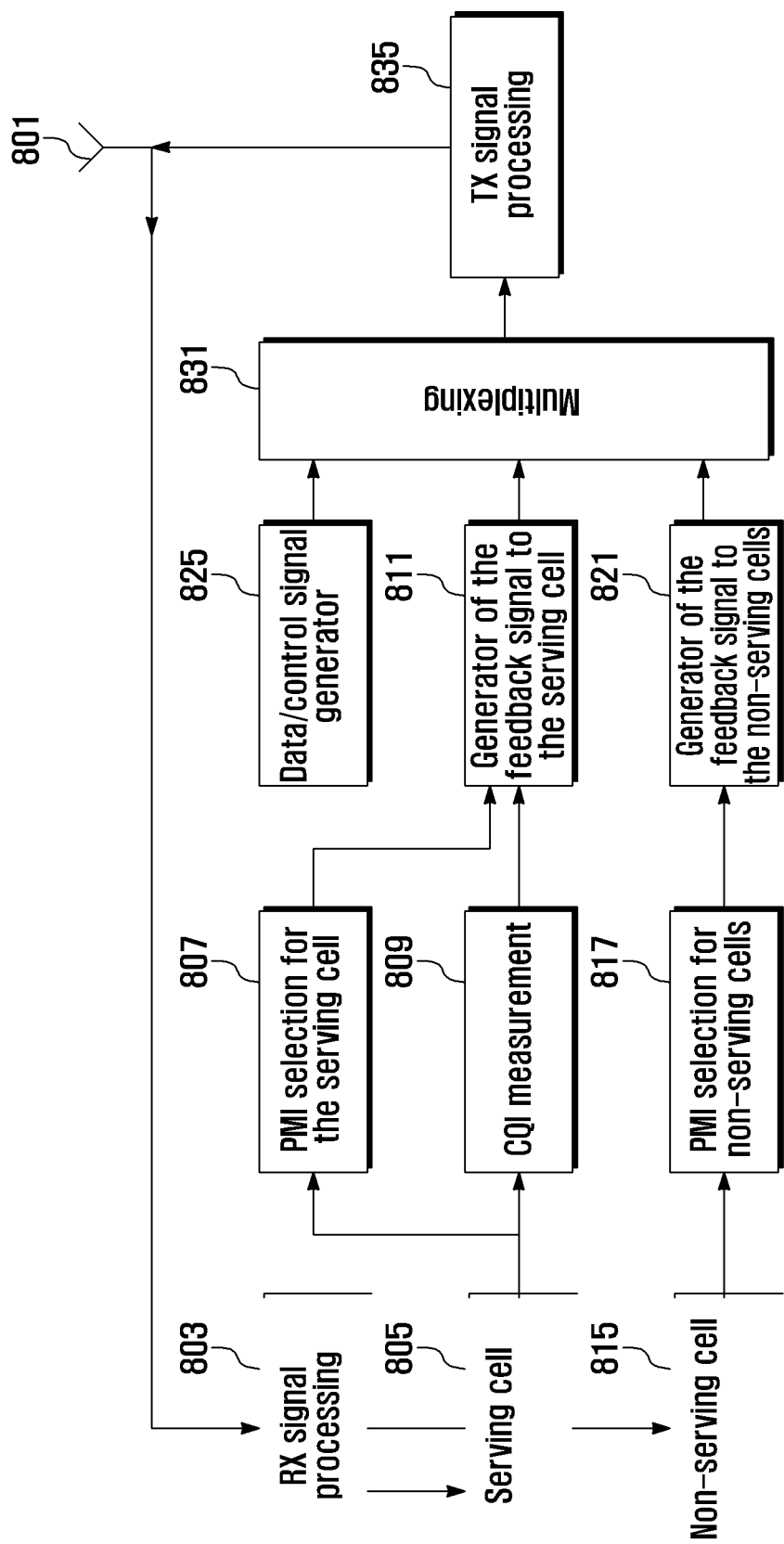
FIG. 8 is a block diagram illustrating a configuration of a mobile station for supporting the cooperative beamforming technique according to an exemplary embodiment of the present invention.

FIG. 8 is a block diagram illustrating a configuration of a mobile station for supporting the cooperative beamforming technique according to an exemplary embodiment of the present invention.

As shown in FIG. 8, the mobile station includes an antenna 801, a received signal processor 803, a serving cell channel estimator 805, a serving cell PMI selector 807, a CQI generator 809, a serving cell feedback generator 811, a neighbor cell channel estimator 815, a neighbor cell PMI selector 817, a neighbor cell feedback generator 821, a data/control information generator 825, a multiplexer 831, and a transmission signal processor 835.

The antenna 801 receives the signals transmitted by the base stations. The received signal processor 803 extracts the reference signals of the serving base station and the neighbor base stations from the signal signals. The serving cell channel estimator 805 estimates the channel of the serving base station from the output of the received signal processor 803. The serving cell PMI selector 807 selects a positive PMI to be reported to the serving base station based on the output of the serving cell channel estimator 805. The CQI measure 809 measures the CQI to be reported to the service base station based on the output of the service cell channel estimator 803. The neighbor cell channel estimator 815 estimates the channel of the neighbor base station form the output of the received signal processor 803. The neighbor cell PMI selector 817 selects a negative PMI to be reported to the neighbor base station based on the output of the neighbor cell channel estimator 815.

The serving cell feedback generator 811 generates the first feedback information to be reported to the serving cell based on the outputs of the serving cell PMI selector 807 and the CQI generator 809. The neighbor cell feedback generator generates the second feedback information to be reported to the neighbor cell based on the outputs of the neighbor cell PMI selector 817. The data/control information generator 825 generates data and other control information to be transmitted to the serving base station. The multiplexer 831 multiplexes the first feedback information output by the serving cell feedback generator 811, the second feedback information output by the neighbor cell feedback generator 821, and the data and control information output by the data/control information generator 825 into a transmission signal. The transmission signal processor 835 superimposes the transmission signal output by the multiplexer 831 on a radio frequency (RF) signal and then transmits the RF signal through the antenna 801.

The mobile station receives the signals transmitted by the base stations and generates the first and second feedback information. The signal received by means of the antenna is transferred to the received signal processor 803. The received signal processor 803 extracts the reference signals of the service base station and the neighbor base stations and outputs the reference signals to the serving base station channel estimator 805 and the neighbor base station channel estimator 815. The serving cell channel estimator 805 estimates the channel of the service base station and outputs the estimated channel value to the CQI generator 809 and the serving cell PMI selector 807. The CQI generator 809 measures the serving base station channel indicated by the estimated channel value and outputs the CQI to the serving cell feedback generator 811 in the form of a CQI. The serving cell PMI selector 807 selects a PMI for the channel indicated by the estimated channel value and outputs the selected PMI as the positive PMI, which is intended to be used by the serving cell, to the serving cell feedback generator 811. The serving cell feedback generator 811 generates the first feedback information containing the CQI of positive PMI. Meanwhile, the neighbor cells channel estimator 815 estimates the channel of the neighbor base station and outputs the estimated channel value to the neighbor cell PMI selector 817. The neighbor cell PMI selector 817 selects a PMI for the channel indicated by the estimated channel value and outputs the selected PMI as the negative PMI, which is intended not to be used by the neighbor base station, to the neighbor cell feedback generator 821. The neighbor cell feedback generator 821 generates the second feedback information containing the negative PMI. The data and control information to be transmitted to the serving base station are generated by the data/control information generator 825. The first feedback information output by the serving cell feedback generator 811, the second feedback information output by the neighbor cell feedback generator 821, and the data and control information output by the data/ control information generator 825 are multiplexed into a transmission signal by the multiplexer 831 and then output to the transmission signal processor 835. The transmission signal is superimposed on the RF signal to be transmitted through the antenna 801.

In short, the mobile station generates and transmits the first feedback information to the serving base station as indicated by reference numeral 531 of FIG. 5 or 651 of FIG. 6; and generates and transmits the second feedback information to the neighbor base station as indicated by reference numeral 533 of FIG. 5 or 653 of FIG. 6. The mobile station is provided with a storage means (not shown) for storing the feedback resources so as to generate first feedback information with the positive PMI transmitted to the service base station and the second feedback information with the negative PMI transmitted to the neighbor base stations.

Figure 9:
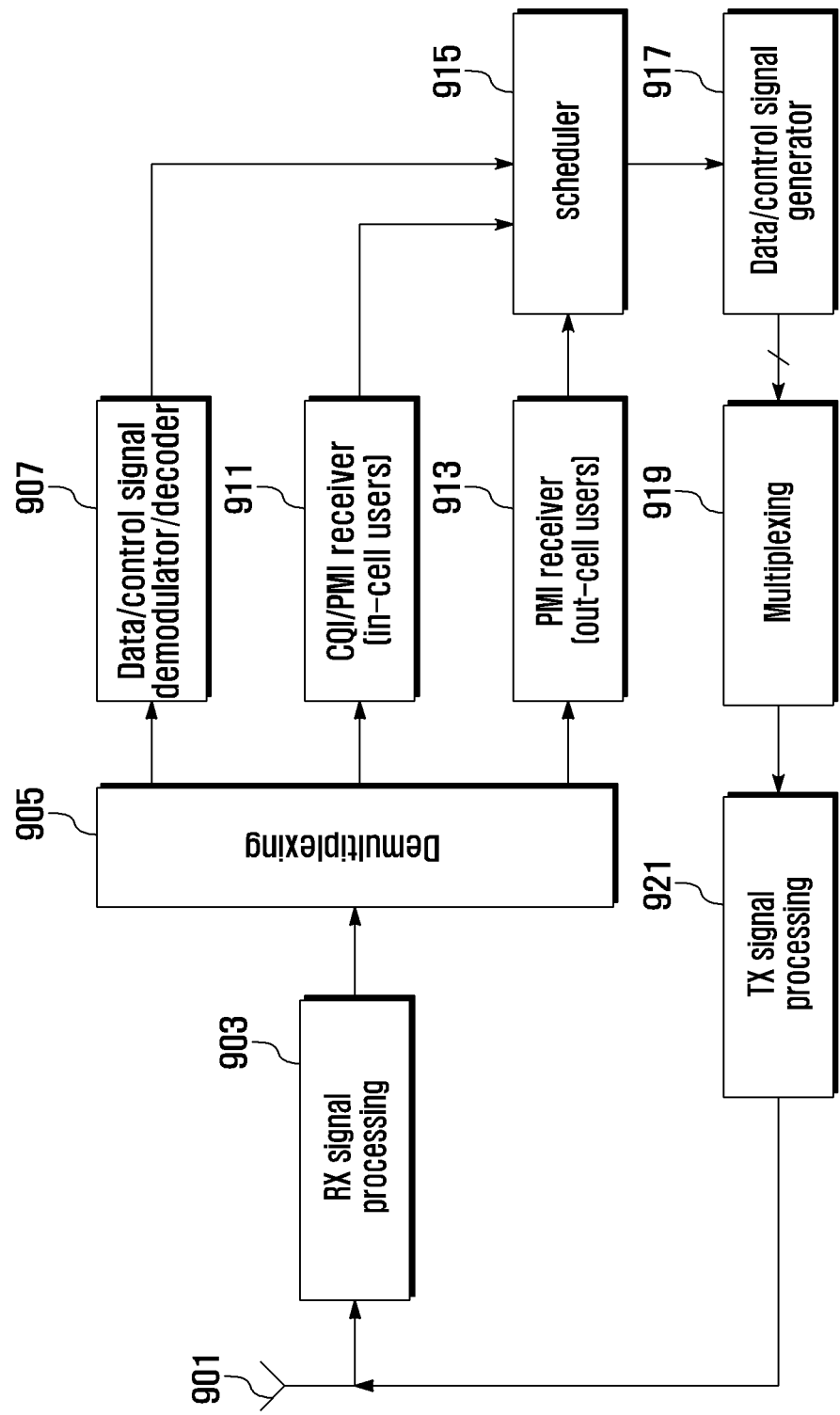
FIG. 9 is a block diagram illustrating a configuration of a base station for supporting the cooperative beamforming technique according to an exemplary embodiment of the present invention.

FIG. 9 is a block diagram illustrating a configuration of a base station for supporting the cooperative beamforming technique according to an exemplary embodiment of the present invention.

As shown in FIG. 9, the base station includes an antenna 901, a received signal processor 903, a demultiplexer 905, a data/control information demodulator/decoder 907, an in-cell CQI/PMI receiver 911, a out-cell PMI receiver 913, a scheduler 915, a data/control information generator 917, a multiplexer 919, and a transmission signal processor 921.

The antenna 901 receives the radio frequency signal transmitted by mobile stations. The received signal processor 903 converts the received radio frequency signal to a baseband signal. The demultiplexer 905 demultiplexes the output of the received signal processor 903 into the data/control information, the first feedback information and/or the second feedback information. The demodulator/decoder 907 demodulates and decodes the data and control information output by the demultiplexer 905.

The CQI/PMI receiver 911 extracts the CQI/PMI from the output of the demodulator 905. Here, the CQI/PMI can be the first feedback information, and the PMI of the first feedback information is the positive PMI. The out-cell PMI receiver 913 extracts the PMI from the output of the demodulator 905. Here, the PMI can be the negative PMI carried by the second feedback information. The scheduler 915 makes a scheduling and beamforming decision base on the output of the in-cell CQI/PMI receiver 911, the PMI receiver 913, and data/control information demodulator/decoder 907. The data/control information generator 917 generates multi-user data and control information based on the scheduling and beamforming decision made by the scheduler 915. The multiplexer 919 multiplexes the multi-user data and control information into transmission signals. The transmission signal processor 921 superimposes the transmission signals on the RF signals to be transmitted through the antenna 901.

The base station analyzes the first feedback information transmitted by the mobile stations within its cell and the second feedback information transmitted by the mobile station within the neighbor cell and controls the beamforming to the mobile station within its cell. The radio frequency signal received by the antenna 901 is output to the received signal processor 903. The radio frequency signal is converted to the baseband signal by the received signal processor 903, and the baseband signal is output to the demultiplexer 905. The base band signal id demultiplexed into the data and control information, the first feedback information and/or the second feedback information by the demultiplexer 905. The data and control information are output to the data/control information demodulator/decoder 907 so as to be demodulated and decoded into the original data and control information by the data/control information demodulator/decoder 907. The first feedback information is output to the in-cell CQI/PMI receiver 911 such that the in-cell CQI/PMI receiver 911 extracts the CQI and positive PMI from the first feedback information. The second feedback information is output to the out-cell PMI receiver 913 such that the out-cell PMI receiver 913 extracts the negative PMI from the second feedback information. The scheduler 915 can be placed at the base station in the distributed network-based communication system as shown in FIG. 6 or implemented as a cluster scheduler outside the base station in the cooperative network-based communication system as shown in FIG. 5. The scheduler 915 is responsible for making a scheduling and beamforming decision and provides the decision result to the data/control information generator 917. The data/control information generator 917 generates the data and control information based on the decision result provided by the scheduler 915. The data and control information generated by the data/control signal generator 917 are multiplexed into transmission signals by the multiplexer 919. Finally, the multiplexed transmission signals are superimposed on the radio frequency signals by the transmission signal processor 921 and then transmitted through the antenna 901.

The cooperative beamforming procedure between the serving and neighbor base stations is described with reference to FIGS. 5 to 9. Here, it is assumed that the mobile station 501 of FIG. 5 (or 601 of FIG. 6) is configured as shown in FIG. 8.

First, the cooperative beamforming procedure of FIG. 5 is described with the operations of the mobile station configured as shown in FIG. 8 and the base stations configured as shown in FIG. 9. The mobile station 501 first receives the signals transmitted by the serving base station 503 and the neighbor base station 507. Upon receiving the signals from the serving and neighbor base stations 503 and 507, the mobile station 501 generates the first feedback information and the second feedback information. At this time, the received signal processor 803 of the mobile station 503 extracts the reference signals of the serving and neighbor base stations 503 and 507 from the received signals and outputs the extracted reference signals to the serving cell channel estimator 805 and the neighbor cell channel estimator 815 respectively. The serving cell channel estimator 805 estimates the channel to the serving base station and outputs the estimated channel value to the serving cell PMI selector 807 and the CQI generator 809 such that the serving cell PMI selector 807 and the CQI generator 809 output the positive PMI and CQI for the serving base station 503. These positive PMI and CQI are input to the serving cell feedback generator 811 such that the serving cell feedback generator 811 outputs the first feedback information containing the CQI and positive PMI. Meanwhile, the negative PMI is input to the neighbor cell feedback generator 815 such that the neighbor cell feedback generator 815 outputs the second feedback information containing the negative PMI.

Next, the mobile station 501 multiplexes the data and control information and the first feedback information containing the CQI and positive PMI by means of the multiplexer 831 and then transmit the multiplexed signal to the serving base station 503 by means of the transmission signal processor 835. The mobile station 501 also transmits the negative PMI to the neighbor base station 507 by means of the transmission signal processor 835.

The serving base station 503 analyzes the signal transmitted by the mobile station 501. The signal transmitted by the mobile station 501 is demultiplexed into the data and control information and the first feedback information by the demultiplexer 905, and the data and control information are output to the data/control signal demodulator/decoder 907 and the first feedback information is output to the in-cell CQI/PMI receiver 911. In FIG. 5, the cluster scheduler 505 is an independent network element. In this case, the base stations can be connected to the cluster scheduler 505 through a wired or wireless link. Accordingly, the serving base station 503 reports the first feedback information acquired by the in-cell CQI/PMI receiver 911 to the cluster scheduler 505.

Meanwhile, the second feedback information is received by the neighbor base station 507 and demultiplexed by the demultiplexer 905 of the neighbor base station 507. The second feedback information is output to the out-cell PMI receiver 913. The neighbor base station 507 also reports the second feedback information to the cluster scheduler 505.

The cluster scheduler 505 makes a scheduling and beamforming decision based on the feedback information reported by the serving and neighbor base stations 503 and 507 and sends the decision result to the serving and neighbor base stations 503 and 507 respectively. At this time, the cluster scheduler 506 makes the scheduling and beamforming decision in consideration of the positive PMI intended to be used by the serving base station 5031 and the negative PMI intended not to be used by the neighbor base station 507.

Upon receipt of the decision result of the cluster scheduler 505, the serving base station 503 multiplexes the data and control information output from the data/control information generator 916 into the transmission signal by means of the multiplexer 919 and transmits the transmission signal by means of the transmission processor 921. At this time, the serving base station 503 forms a transmission beam focused to the mobile station 501 based on the beamforming decision result provided by the cluster scheduler 505. Meanwhile, the neighbor base station 507 forms a transmission beam based on the beamforming decision result provided by the cluster scheduler 505 so as not to interfere the transmission of the serving base station 503.

Second, the cooperative beamforming procedure of FIG. 6 is described with the operations of the mobile station configured in FIG. 8 and the base stations configured as shown in FIG. 9. The operations of the mobile station 601 for generating the first feedback information containing the CQI/PMI to be transmitted to the serving base station 603 and the second feedback information containing the PMI to be transmitted to the neighbor base station 607 are identical with those of the mobile station 501 in FIG. 5. Also, the operations of the serving base station 603 and the neighbor base station 607 for extracting the feedback information are identical with those of the serving and base stations 503 and 507.

In case of the distributed network structure-based cooperative beamforming procedure as shown in FIG. 6, the scheduler 915 integrated into the base station performs the functions of the cluster scheduler 505 of FIG. 5.

Accordingly, when the serving base station 603 receives the CQI/PMI (the PMI can be a positive PMI required to be used by the serving base station), the scheduler 915 makes a scheduling and beamforming decision and provides the decision result to the data/control information generator 917. The data/control information generator 917 generates the data and control information based on the scheduling and beamforming decision result of the scheduler 915. The data and control information generated by the data/control information generator 917 are multiplexed into the transmission signal by the multiplexer 919. The transmission signal is superimposed on the radio frequency signal by the transmission signal processor 921, and the radio frequency signal is transmitted through the antenna 901. At this time, the radio frequency signal is transmitted in the form of a beam focused to the mobile station 601 based on the positive PMI.

In the meantime, when the neighbor base station 605 receives the CQI/PMI (the PMI can be a positive PMI required to be used by the neighbor base station), the scheduler 915 makes a scheduling and beamforming decision and provides the decision result to the data/control information generator 917. At this time, the scheduler 915 makes the scheduling and beamforming decision in consideration of the negative PMI reported by the mobile station 601 connected to other base station 601 and the CQI and positive CQI reported by the in-cell mobile stations (i.e. served by the base station 607).

The data/control information generator 917 generates the data and control information based on the scheduling and beamforming decision result of the scheduler 915. The data and control information generated by the data/control information generator 917 are multiplexed into the transmission signal by the multiplexer 919. The transmission signal is superimposed on the radio frequency signal by the transmission signal processor 921, and the radio frequency signal is transmitted through the antenna 901. At this time, the radio frequency signal is transmitted in the form of a beam focused to the mobile station 607 based on the negative PMI reported by the mobile station 601 as well as the positive PMI reported by the mobile station 607.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A beamforming method of a mobile station in a wireless communication system, comprising:
    transmitting a channel condition information of a channel of a serving base station to the serving base station;
    transmitting a feedback information regarding suppressing interference of a channel of a non-serving base station to the non-serving base station; and
    receiving from the serving base station, a control information about a beam formed based on the channel condition information to transmit a signal,
    wherein the channel condition information of the serving base station comprises a Channel Quality Indicator (CQI) and a Precoding Matrix Indicator (PMI), and
    wherein the feedback information of the non-serving base station comprises a PMI.

2. The beamforming method of claim 1, wherein transmitting the feedback information of the non-serving base station comprises:
    transmitting the feedback information of the non-serving base station through one of resources mapped to channel condition indices allocated for the non-serving base station.

3. The beamforming method of claim 1, further comprising:
    estimating, when receiving a signal, the channels of the serving base station and non-serving base station, and measuring channel qualities of the serving base station and non-serving base station,
    wherein the channel condition information indicates the channel quality of the serving base station to the serving base station, and
    wherein the feedback information indicates the channel quality of the non-serving base station to the non-serving base station.

4. A beamforming method of a base station in a wireless communication system, comprising:
   receiving, from a first mobile station being served by the base station, a channel condition information for a channel between the base station and the first mobile station;
   receiving, from a second mobile station not being served by the base station, a feedback information regarding suppressing interference with a channel between the second mobile station and a base station serving the second mobile station; and
   forming a beam based on the channel condition information and the feedback information to transmit a signal,
   wherein the channel condition information from the first mobile station comprises a Channel Quality Indicator (CQI) and a Precoding Matrix Indicator (PMI), and
   wherein the feedback information of the second mobile station comprises a PMI.

5. The beamforming method of claim 4, wherein forming the beam comprises:
   forwarding the channel condition information to a scheduler;
   receiving a beamforming decision made based on the channel condition information by the scheduler; and
   forming the beam based on the beamforming decision.

6. A feedback device of a mobile station for supporting beamforming in a wireless communication system, comprising:
   a reception signal processor which processes signals received from a serving base station and a non-serving base station;
   a serving cell condition measurer which measures a channel condition of a channel of the serving base station based on the signal received from the serving base station;
   a serving cell channel estimator which estimates a channel of the serving base station based on the signal received by the received signal processor, wherein the serving cell channel estimator comprises:
      a Channel Quality Indicator (CQI) generator which measures channel quality and generates a CQI base on the measurement;
      a serving cell Precoding Matrix Indicator (PMI) selector which selects a PMI for the channel of the serving base station; and
      a serving cell feedback generator which generates a feedback information containing the CQI and PMI;
   a non-serving cell condition measurer which measures a channel condition of a channel of the non-serving base station based on the signal received from the non-serving base station; and
   a transmission signal processor which transmits, based on the measured channel condition of the channel of the serving base station, channel condition information of the channel of the serving base station to the serving base station and transmits, based on the measured channel condition of the channel of the non-serving base station, feedback information regarding suppressing interference by the non-serving base station to the non-serving base station.

7. The feedback device of claim 6, wherein the transmission signal processor transmits feedback of the non-serving base station through one of resources mapped to channel condition indices allocated for the non-serving base station.

8. The feedback device of claim 6, further comprising:
   a non-serving cell channel estimator which estimates a channel of the non-serving cell based on the signal received by the reception signal processor.

9. The feedback device of claim 8, wherein the non-serving cell channel estimator comprises:
   a non-serving Precoding Matrix Indicator (PMI) selector which selects a PMI for the channel of the non-serving base station; and
   a non-serving cell feedback generator which generates a feedback information containing the PMI.

10. The feedback device of claim 6, further comprising:
    a data/control information generator which generates data and control information destined to the serving base station; and
    a multiplexer which multiplexes the channel conditions of the serving and non-serving base stations, and the data and control information.

\* \* \* \* \*